Nov. 24, 1964     F. SMECKO     3,157,946
SCRAPER AND CUTTER
Filed Nov. 13, 1962     2 Sheets-Sheet 1
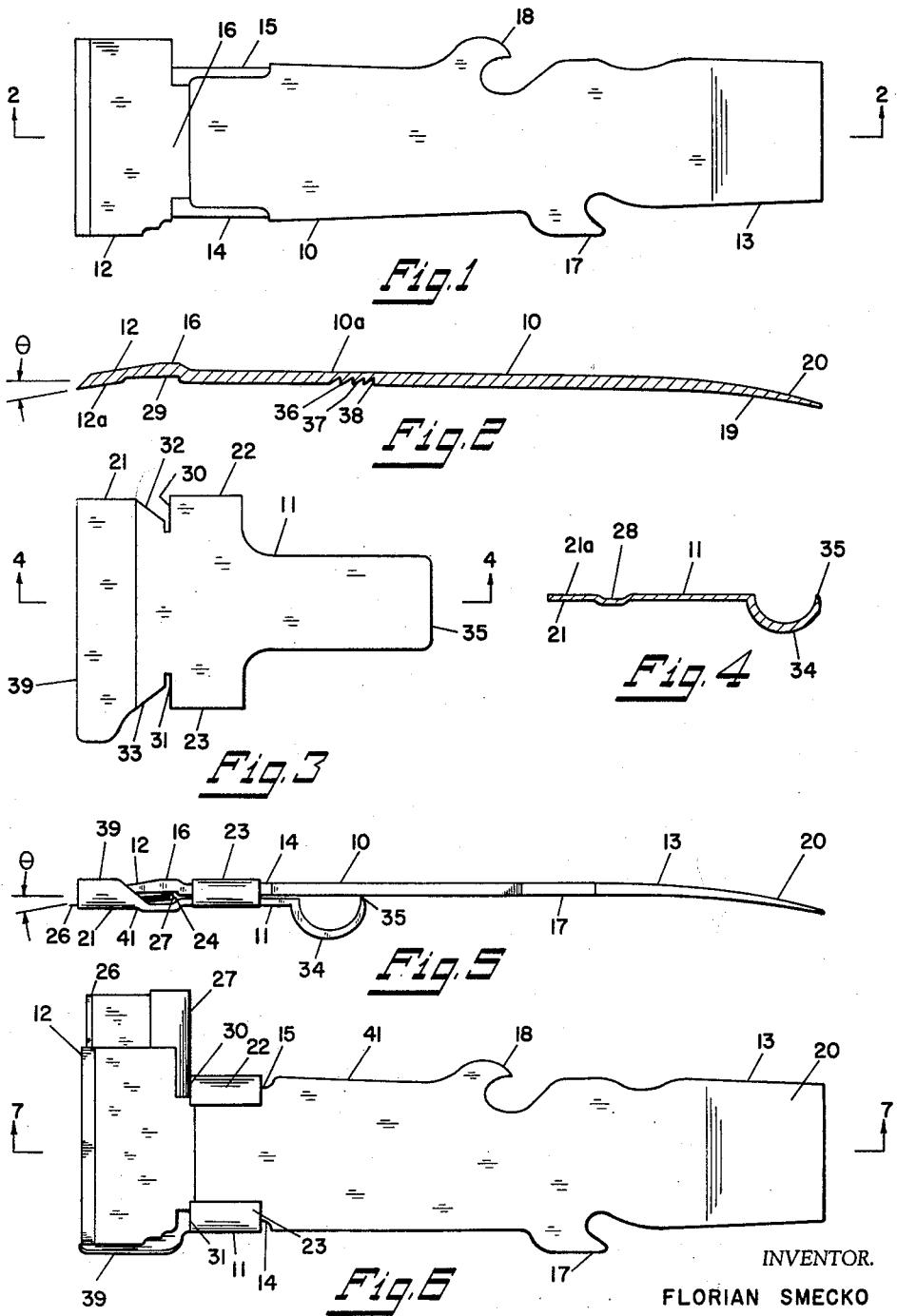
INVENTOR.
FLORIAN SMECKO
BY Joseph G. Werner
ATTORNEY Nov. 24, 1964     F. SMECKO     3,157,946
SCRAPER AND CUTTER Filed Nov. 13, 1962     2 Sheets-Sheet 2

INVENTOR.
FLORIAN SMECKO
BY Joseph G. Werner
ATTORNEY

United States Patent Office 3,157,946
Patented Nov. 24, 1964

3,157,946
SCRAPER AND CUTTER
Florian Smecko, 1351 Wingra Drive, Madison, Wis.
Filed Nov. 13, 1962, Ser. No. 237,091
13 Claims. (Cl. 30—169)

This invention relates to an improvement in the class of scrapers and cutters which has a removable blade.

One object of the invention is to provide a scraper of sturdy construction which requires no screws, springs, rivets or welds.

A second object is to provide a scraper of such uncomplicated construction that the elements which form the scraper can be manufactured with only two dies.

A third object is to provide a scraper which has a guide means that permits the scraper to accurately scrape to the outer edge of a surface which has a curved frame or border.

A fourth object is to provide a scraper of the removable blade type which has means for adjusting the distance the exposed portion of the blade extends beyond the end of the scraper.

A fifth object is to provide a scraper which has blade support surfaces immediately adjacent the cutting edge of the blade.

A sixth object is to provide a scraper which has a handle that integrally incorporates a paint can opener, a bottle opener, a putty knife, and a prying bar.

Other objects and advantages of my invention will be apparent from the following detailed description taken in conjunction with the accompanying drawings wherein a preferred embodiment of the principles of the invention has been selected for exemplification.

In the drawings:

FIG. 1 is a top view of the stationary element of the scraper of my invention.

FIG. 2 is a vertical section view taken along line 2—2 in FIG. 1.

FIG. 3 is a top view of the slidable element of the scraper before it is attached to the stationary element.

FIG. 4 is a vertical section view taken along line 4—4 in FIG. 3.

FIG. 5 is a side view of the complete scraper of my invention with the blade extended.

FIG. 6 is a top view of the complete scraper of my invention with the blade retracted and partially removed.

Figure 7:
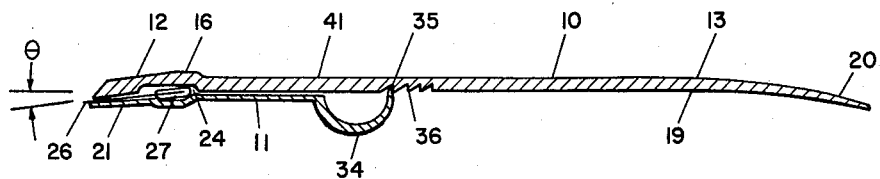
FIG. 7 is a vertical section view taken along line 7—7 in FIG. 6.

The scraper 41 of my invention has only three parts, a stationary element 10, a clamping or slidable element 11, and a removable blade 26. As seen in FIG. 1, the stationary element 10 has a blade support end 12, which is shaped in the general outline of the removable blade 26 to serve as the top support surface 12a for the blade 26, and a handle end 13. Elongated notches 14 and 15 are formed in each of the opposing side edges of the stationary element 10 immediately behind the blade support end 12. As best shown in FIG. 5, the thickness of the stationary element 10 may vary along the length of the notches 14 and 15, with the thickest portion of the stationary element 10 occuring at the shoulder 16, which is located at the end of the notches adjacent the blade support end 12 and which extends between the notches.

The number of possible uses for the scraper may be greatly increased by the incorporation of several features into the handle end 13 of the stationary element 10. Projections 17 and 18 may serve as a paint can opener and a bottle opener, respectively. The handle end 13 may have a slight bend 19 to make the handle end 13 an effective prying bar for use in opening windows stuck shut with paint, or for any other purpose where a relatively large amount of leverage is required. Gently beveling the rearmost surface 20 of the handle end 13 makes it available as a convenient putty knife. Other features, such as a screwdriver, may be incorporated into the handle end 13 as desired.

The clamping element 11 illustrated in FIGS. 3 and 4 has a front or blade support end 21 which, like the blade support end 12 of the stationary element 10, is shaped in the general outline of the removable blade to serve as the bottom support surface 21a for the blade. Tabs 22 and 23 are formed in the sides of the element 11 immediately behind the blade support end 21.

Enough structure has now been given to describe how the stationary element 10 is joined to the clamping element 11 without the need of any screws, springs, rivets or welds. With the clamping element 11 positioned as illustrated in FIG. 4, the stationary element 10 is placed on top of the clamping element 11 with the top blade support surface 12a facing the bottom blade support surface 21a, yet leaving sufficient space between the support surfaces 12a and 21a for insertion of a blade. Next the tabs 22 and 23 are curled over the edges of the notches 14 and 15 to force the tabs 22 and 23 into close slidable engagement with the stationary element 10. As best shown in FIG. 6, the edges of the notches 14 and 15 form tracks over which the curled tabs 22 and 23 may slide.

It is very important that the blade support surfaces 12a and 21a are maintained in sufficiently close engagement to firmly grip the removable blade 26 when it is inserted between the surfaces. The closeness of engagement is primarily determined by the closeness of the fit of the curled tabs 22 and 23 to the edges of the notches 14 and 15. However, the closeness of the fit of the curled tabs 22 and 23 is limited by the fact that the tabs must be able to slide easily over the edges of the notches 14 and 15. For this reason, several features, hereinafter described, which aid in bringing the blade support surfaces 12a and 21a into the close engagement required for firm gripping of the blade 26 may be added as desired and are illustrated in the preferred embodiment of the scraper 9 shown in the drawings. The blade support end 12 may be bent at a small angle $\theta$ to the central portion 10a of the stationary element 10, as shown in FIG. 2. This bending brings the top blade support surface 12a into closer engagement with the flat bottom blade support surface 21a of the clamping element 11. In alternative embodiments of the scraper, the blade support end 21 of the clamping element 11 may be bent toward the blade support surface 12a or both the ends 12 and 21 may be slightly bent from the horizontal toward each other. Another desirable feature is to contour the blade support surfaces 12a and 21a to the outline of the removable blade 26. Since the blade may be a razor blade 26 of the type having a guard member 27, as shown in FIG. 6, grooves 28 and 29 should preferably be provided in the blade support surfaces 12a and 21a, respectively, to correspond to the guard member 27 of the blade 26. Contouring is, of course, possible for other kinds of blades as well. A further feature that promotes close engagement of the blade support surfaces 12a and 21a is the shoulder 16 formed on the stationary element 10. The shoulder 16, as previously explained, makes the stationary element 10 thickest at the end of the notches 14 and 15 adjacent the blade support end 12. When the front edges 30 and 31 of the curled tabs 22 and 23 ride up over the surfaces defined by the shoulder 16, as shown in FIG. 6, the clamping element 11 is naturally forced into closer engagement with the stationary element 10.

As indicated by FIG. 6, the blade 26 is injected and removed from the side of the scraper 41. For injection, the guard member 27 of the blade 26 is inserted in the pocket 24 formed by the corresponding grooves 28 and 29 and slid into position. For easy removal, the rear corners 32 and 33 of the blade support end 21 of clamping element 11 may be beveled, as indicated in FIG. 3, to expose the corners of the guard member 27. One of the exposed corners is pushed to start the blade 26 out of the pocket 24. Then the end of the blade exposed by this pushing may be grasped by the operator and the blade pulled out. The rear corners of the blade support end 12 of the stationary element 10 may be beveled instead of the corners of the blade support end 21 or both the blade support ends 12 and 21 may have beveled corners.

One of the prime advantages of the present scraper is the adjustability of the distance the exposed portion of the blade extends beyond the end of the scraper 41. While the basic two-piece construction thus far described for the scraper 9 may be used to construct a fixed blade scraper by making the tabs 22 and 23 of the clamping element 11 the same length as the notches 14 and 15, in the preferred scraper the curled tabs are made shorter than the notches 14 and 15 so that they can travel back and forth the length of the notches. When the elements 10 and 11 are forced into sufficiently close engagement by the various preferred expedients of bending the blade support end 12 of the stationary element 10 at a small angle $\theta$, contouring the blade support surfaces 12a and 21a to the outline of the blade 26 with the grooves 28 and 29, and putting the shoulder 16 on the stationary element 10, the blade 26 will precisely and exactly slide forward to any desired position when the clamping element 11 slides forward. The rear end 34 of the clamping element 11 is curved in a generally semicylindrical shape as shown in FIG. 4. The curved rear end 34 provides a convenient surface for sliding the clamping element 11 forward with the thumb when the fingers of the operator grasp the scraper.

The rear edge 35 of the curved rear end 34 and the indentations 36 formed in stationary element 10 serve as a preferred means of locking the clamping element 11, and thus the blade 26, in any desired position. As best seen in FIG. 7, the curved rear end 34 is sufficiently bent to allow the rear edge 35 to deeply engage the desired indentation. As an aid to the bending of the rear edge 35 of the curved rear end 34 into deep engagement with the indentations 36, the curved rear end 34 may be of a resilient material which causes the rear edge 35 to spring into engagement with the indentations 36. The walls of the indentations 36 are carefully designed to permit the edge 35 to easily slide forward to another indentation, yet to prevent it from sliding back one or more indentations, thus retaining the blade 26 in fixed position when it is extended for use. Looking at FIG. 2, the front walls 37 of each indentation slope downward and forward toward the blade support end 12 of the stationary element 10 to permit the rear edge 35 to slide forward easily, whereas the rear walls 38 of each indentation are substantially vertical to prevent the edge 35 from sliding back an indentation because of the rearward acting force generated by a cutting or scraping operation. The result of this careful designing of the walls of the indentations 36 is that the clamping element 11 may be easily moved forward one or more indentations by applying moderate thumb pressure to the curved rear end 34, while the conscious effort of grasping the scraper 41 in one hand and lifting up and pulling back the curved rear end 34 with the other hand is required to slide the clamping element 11 back one or more indentations. As is apparent from this description, the generally semi-circular shape of the curver rear end 34 is not critical. Any shape which provides a convenient surface for sliding the clamping element 11 back and forth and serves to deeply engage the rear edge 35 in the indentations 36 is satisfactory.

Figure 8:
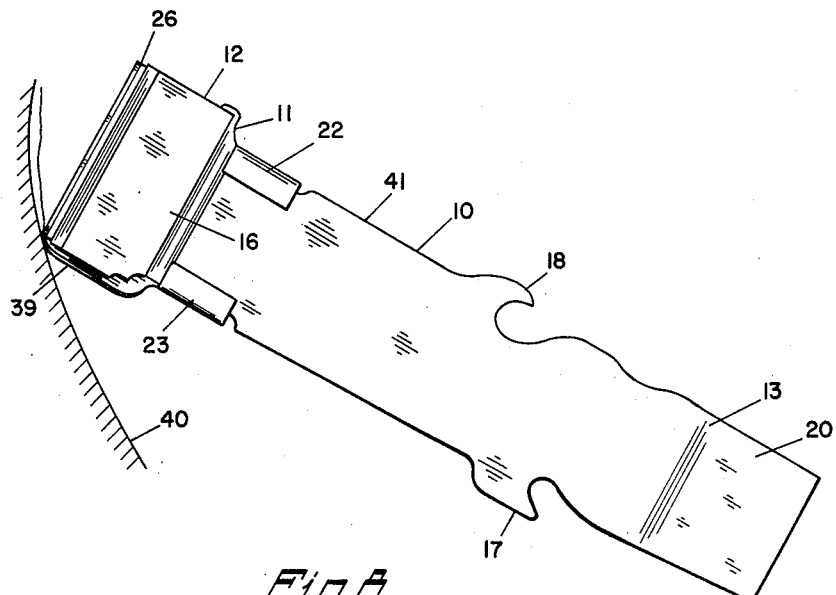
FIG. 8 is a top view showing the use of my invention in scraping a surface which has a curved frame or border.
Figure 9:
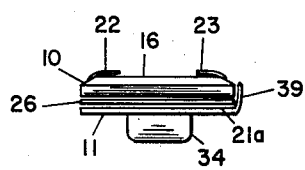
FIG. 9 is a front view of my complete scraper.

Another important feature of my scraper 41 is the provision of a guide means on the scraper which makes it possible for the scraper to accurately scrape to the outer edge of a surface which has a curved frame or border. This feature is very advantageous, for example, when a workman is scraping paint from the edges of a round window which is framed or has a border. Scraping round windows with those scrapers known to the prior art is a slow and tedious job because of the difficulty of following a curved border with such scrapers and because of the danger of gouging the circular window frame. The guide means of the present scraper permits the quick and safe scraping of round windows or any other surface surrounded by a curved frame or border. The guide means comprises a lip 39 integrally formed on one side of the blade support end 21 of the clamping element 11, as shown in FIG. 3. The guide lip 39 is preferably substantially vertical when my scraper is completely assembled. The lip 39 is therefore bent substantially perpendicular to the bottom blade support surface 21a as illustrated by FIG. 9. Once bent into the desired vertical position shown in FIG. 5, the lip 39 performs an additional function to the guide function. It also serves as a means to center the blade 26 under the blade support surfaces 12a and 21a and to prevent any tendency of the blade 26 to slide sideways out of the scraper 41. The operation of a scraper with the guide lip 39 is evident from FIG. 8. The lip 39 is positioned along the curved frame or border 40 and the scraping action of the blade 26 on the window or other surface to be scraped continues as the lip 39 follows the curved frame or border 40. Although in the illustrated preferred embodiment the lip 39 is an integral part of the clamping element 11, it is to be understood that the lip may instead be made an integral part of the stationary element 10 if desired.

Another feature of the preferred embodiment of the invention, best illustrated in FIG. 6, is the making of the blade support surfaces 12a and 21a as wide as the blade 26 is long. With no portion of the blade extending beyond the side edges of the blade support surfaces 12a and 21a, any danger of gouging the window frames when scraping paint from windows, for instance, is minimized. A second advantage of conforming the blade support surfaces 12a and 21a to the general geometric area of the blade 26, taken in conjunction with the readily apparent close engagement of the blade support surfaces 12a and 21a to the blade, is that sturdy surfaces firmly support substantially all of the blade 26 except the immediate exposed cutting edge. Because of the firm support, there is no tendency of the blade to break, even when the blade is a very thin razor blade. Such a tendency to break is present in most prior art scrapers, which do not have the sturdy, closely engaging support surfaces of the present scraper. As a result of such lack of sturdy support surfaces it is very difficult for an operator to accurately cut wall paper or avoid frequent breaking of the blade when using the prior art scrapers. Such difficulties are greatly reduced by the present scraper 9.

My scraper is made from only two uncomplicated pieces of flat stock. Only two dies are required to manufacture these two pieces, as compared to the much greater number of dies required to manufacture most prior art scrapers. No screws, springs, rivets, welds, or similar expedients are used in the scraper. A novel guide means which allows the scraper to accurately scrape to the outer edge of a surface surrounded by a curved frame or border is disclosed. Means are provided for adjusting the distance the exposed portion of the removable blade extends beyond the end of the scraper and for locking the blade at the desired distance. Past scrapers which did not have adjustable blades were considerably more dangerous than mine because of the possibility that the blade would snap off and cause injury when the fixed exposed portion of the blade was too long for the use to which it was put. Other advantages of my scraper appear in the above detailed description of the preferred embodiment.

It is understood that my invention is not confined to the particular construction and arrangement of parts herein illustrated and described, but embraces all such modified forms thereof as come within the scope of the following claims.

I claim:

1. A scraper of the removable blade type consisting of a removable blade and two elements, each of said elements having one of its ends formed in the general outline of said removable blade to serve as a blade support surface, one of said two elements having its blade support surface contoured to engage said blade and being slidable relative to the other element to move said blade and thereby adjust the distance an exposed portion of said blade extends beyond the adjacent end of said other element, and means to lock said slidable element in one of a plurality of preselected positions.

2. The scraper of claim 1 which includes integral means in each of the two elements to maintain the blade support surfaces in close engagement to firmly grip the removable blade.

3. The scraper of claim 1 which includes guide means to enable the scraper to accurately follow curved borders.

4. A scraper of the removable blade type consisting of a stationary element having two opposing side edges, a clamping element having two opposing side edges and a front and a rear end, and a removable blade, said stationary element having a blade support end and a handle end, said blade support end having the general outline of said removable blade to define a top support surface for said blade, an elongated notch formed in each of said two opposing side edges of said stationary element adjacent said support end, a plurality of indentations longitudinally spaced in said stationary element, said clamping element having said front end shaped in the general outline of the blade to define a bottom support surface for the blade, a tab extending from each of said two opposing side edges of said clamping element adjacent said front end, said top blade support surface facing said bottom blade support surface, said tabs curling over said opposing side edges of said stationary element within said notches to closely engage said clamping element to said stationary element, said tabs being shorter in length than said elongated notches whereby said clamping element is movable relative to said stationary element to adjust the distance an exposed portion of said removable blade extends beyond the blade support end of said stationary element, said rear end of said clamping element being selectively engagable in said indentations in said stationary element to lock said clamping element in a plurality of preselected position.

5. The scraper of claim 4 wherein the rear end of the clamping element is curved in a generally semicylindrical shape with a rear edge, and said indentations each have two walls, the wall of each indentation toward the blade support end of said stationary element sloping downward and forward toward said blade support end, and the wall of each indentation toward the handle end of said stationary element being substantially vertical, each of said indentations being individually adapted to engage said rear edge of said curved rear end of said clamping element to lock said clamping element in a desired position.

6. The scraper of claim 5 wherein the curved rear end of the clamping element is of a resilient material.

7. The scraper of claim 4 in which the stationary element is thicker at the end of the notches adjacent the blade support end than at the end of said notches adjacent the handle end.

8. The scraper of claim 4 which includes a guide means for accurately following curved borders.

9. The scraper of claim 8 in which the guide means is a lip integrally formed on a side edge of the front end of the clamping element.

10. The scraper of claim 8 in which the guide means is an integral side lip of the front end of the clamping element, said lip being bent substantially perpendicular to the blade support surface of said clamping element.

11. The scraper of claim 4 in which the blade support ends of the stationary and clamping elements are as wide as the cutting edge of the blade is long.

12. The scraper of claim 4 in which the blade support surfaces of the stationary element and the clamping element are contoured to mate closely with the surface of the removable blade.

13. The scraper of claim 4 wherein the rear end of the clamping element is curved in a generally semicylindrical shape having a rear edge, and the stationary element has a series of indentations, each of said indentations being individually adapted to engage said rear edge of said clamping element to lock said clamping element in a desired position.

References Cited by the Examiner

UNITED STATES PATENTS

| | | | |
|---|---|---|---|
| 350,856 | 10/86 | Wright | 30—169 |
| 1,231,746 | 7/17 | Knysz | 7—14.6 |
| 1,476,033 | 12/23 | Anderson | 30—169 |
| 1,956,405 | 4/34 | Toman | 30—169 X |
| 1,969,785 | 8/34 | Eisenberg | 30—333 |
| 2,046,334 | 7/36 | Loeber | 30—169 |
| 2,092,586 | 9/37 | Naumovich. | |
| 2,105,960 | 1/38 | L'Wolfe | 30—333 |
| 2,213,071 | 8/40 | Keller | 30—169 |
| 2,236,323 | 3/41 | Stachowiak | 30—169 |
| 2,505,161 | 4/50 | Van Fleet. | |
| 2,524,475 | 10/50 | Renz | 7—14.6 X |
| 2,674,005 | 4/54 | Simon | 30—169 X |

WILLIAM FELDMAN, *Primary Examiner.*

MILTON S. MEHR, *Examiner.*